United States Patent
Segi et al.

(10) Patent No.: US 6,542,288 B1
(45) Date of Patent: Apr. 1, 2003

(54) OPTICAL AMPLIFIER UTILIZING RARE EARTH ELEMENT-DOPED OPTICAL FIBERS FOR TEMPERATURE COMPENSATION

(75) Inventors: Takeshi Segi, Sakura (JP); Takuya Aizawa, Sakura (JP); Tetsuya Sakai, Sakura (JP); Takafumi Kashima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/714,045

(22) Filed: Nov. 16, 2000

(30) Foreign Application Priority Data

Nov. 17, 1999 (JP) .......................................... 11-326289
Sep. 7, 2000 (JP) ...................................... 2000-272132

(51) Int. Cl.$^7$ .............................................. H04B 10/12
(52) U.S. Cl. ..................................................... 359/337
(58) Field of Search ............................ 359/337, 337.1, 359/337.11, 341.41, 341.42, 349, 341.3, 333

(56) References Cited

U.S. PATENT DOCUMENTS 6,144,788 A * 11/2000 Ang et al. ..................... 385/31

FOREIGN PATENT DOCUMENTS

| JP | 05-075198 | 3/1993 |
| JP | 06-317710 | 11/1994 |
| JP | 09-293922 | 11/1997 |
| JP | 10-133157 | 5/1998 |
| WO | WO99/19949 | 4/1999 |

OTHER PUBLICATIONS

Kagi et al. J of Lightwave Tech. vol. 9, No. 2 Feb. 1991.*
Bolshtyansky et al. J of Lightwave Tech. vol. 18, No. 11, Nove 2000.*
Quoi et al. "Rare–Earth Doped Optical Fibers for Temperature Sensing" Jun. 1992, Journal of Lighatwave Technology vol. 10 No. 6 pp, 847–852.*

* cited by examiner

Primary Examiner—Thomas G. Black
Assistant Examiner—Stephen Cunningham
(74) Attorney, Agent, or Firm—Chadbourne & Parke, LLP

(57) ABSTRACT

In an optical amplifier using a rare earth element-doped optical fiber such as an erbium-doped optical fiber, a variation of amplification gain resulting from temperature change is suppressed and the gain-temperature characteristic is enhanced. Moreover, the quantity of temperature compensation in the gain is easily adjustable. Light from an excitation light source is input to an optical fiber for optical amplification comprising a rare earth element-doped optical fiber, via a temperature compensation optical fiber comprising a rare earth element-doped optical fiber such as an erbium-doped optical fiber. By changing the length of this temperature compensation optical fiber, the quantity of temperature compensation is finely adjusted.

5 Claims, 5 Drawing Sheets

"PRIOR ART"

OPTICAL AMPLIFIER UTILIZING RARE EARTH ELEMENT-DOPED OPTICAL FIBERS FOR TEMPERATURE COMPENSATION

CROSS-REFERENCE TO RELATED APPLICATIONS

This application claims foreign priority under 35 U.S.C. §119 of Japanese Patent Application No. 11-326289, filed Nov. 17, 1999 and Japanese Patent Application No. 2000-272132, filed Sep. 7, 2000.

BACKGROUND OF THE INVENTION

1. Field of the Invention

The present invention relates to an optical amplifier which uses a rare earth element-doped optical fiber applied to a wavelength division multiplexed (WDM) optical transmission system or the like. More specifically, the present invention is for obtaining an optical amplifier having small variation of gain with respect to changes in ambient temperature, and excellent temperature characteristics.

2. Description of the Related Art

Recently, optical amplifiers using optical fibers doped with a rare earth element such as erbium (Er), praseodymium (Pr), thulium (Tm) or neodymium (Nd); that is rare earth element-doped optical fibers, have been used for WDM-method optical transmission systems.

These optical amplifiers utilize the operation where an exciting light such as a laser beam is transmitted to a core of the rare earth element-doped optical fiber, the rare earth element ions are pumped with the exciting light to thereby form population inversion, and a signal light is input to the core in this state, to produce stimulated emission, and thereby optically amplify the input signal light.

Of the rare earth elements, particularly, with an optical amplifier using an optical fiber doped with erbium; that is an erbium-doped optical fiber (Erbium-doped Fiber Amplifier, EDFA), signal light of the 1550 nm band can be amplified with high gain and low noise. Hence application to high-speed, large-capacity, long-distance transmission systems is expected by means of high-density wavelength multiplexing.

FIG. 8 shows an example of a conventional optical amplifier of this type.

The signal light from an optical transmission line 10 passes through an optical isolator 11, and is input to an erbium-doped optical fiber 13 via an optical coupler 12. On the other hand, exciting light from an excitation light source 14 such as a semiconductor laser is input to the erbium-doped optical fiber 13 via the optical coupler 12. In the erbium-doped optical fiber 13, the signal light is optically amplified depending on the intensity of the exciting light, and the amplified signal light is output as an output signal light via an optical isolator 15, and transmitted to the optical transmission line 10.

With such an optical amplifier, it is known that the gain of the erbium-doped optical fiber 13 at the time of amplification decreases, with an increase in the environmental ambient temperature, and the decreased amount thereof differs depending on the wavelength.

In order to suppress a variation of gain due to temperature fluctuations, a method has been conventionally adopted in which the intensity of the output light from the erbium-doped optical fiber 13 or the ambient temperature of the optical amplifier is measured, and the input intensity of the exciting light from the excitation light source 14 such as a semiconductor laser, to the erbium-doped optical fiber 13 is electrically controlled base on the measurement.

Moreover, with a method disclosed in, for example, Japanese Unexamined Patent Application, First Publication No. Hei 9-293922, a measure is taken such that a temperature compensator having a loss-temperature characteristic which compensates for the variation in gain of the erbium-doped optical fiber 13 due to the temperature change, is inserted between the optical coupler 12 which combines the signal light and the exciting light, and the excitation light source 14.

With the former method however, since a sensor for detecting the output light, temperature or the like and an electronic circuit for control are required, there is a problem in that the entire apparatus becomes complicated and expensive. With the method which changes the output of the exciting light, there is a problem in that if the driven current of the semiconductor laser, being the excitation light source, is changed, the wavelength of the exciting light also changes, to thereby change the amplification characteristic itself of the erbium-doped optical fiber.

On the other hand, with the latter optical amplifier, it is difficult to obtain a temperature compensator having a desired loss-temperature characteristic, and it is also practically impossible to perform adjustment of the temperature characteristic.

SUMMARY OF THE INVENTION

It is therefore an object of the present invention to provide an optical amplifier which is hardly affected by changes in the ambient temperature, can obtain a stable amplification gain, and for which the gain-temperature characteristic can be easily adjusted.

Such an object can be achieved by inserting between an optical fiber for optical amplification which amplifies a signal light by photoexcitation and an excitation light source for supplying exciting light to the optical fiber for optical amplification, an optical fiber for temperature compensation which changes a supply quantity of the exciting light with temperature change, to thereby compensate for variations in gain with temperature change of the optical fiber for optical amplification.

As the optical fiber for temperature compensation, a rare earth element-doped optical fiber is preferable, and particularly, an erbium-doped optical fiber doped with 1000 to 2000 ppm of erbium is preferable.

Moreover, the intensity of the exciting light emitted from the optical fiber for temperature compensation can be finely adjusted by adjusting the length of the optical fiber for temperature compensation, to thereby easily obtain a desired temperature characteristic.

DESCRIPTION OF THE PREFERRED EMBODIMENTS

The present invention will now be described in detail.

Figure 1:
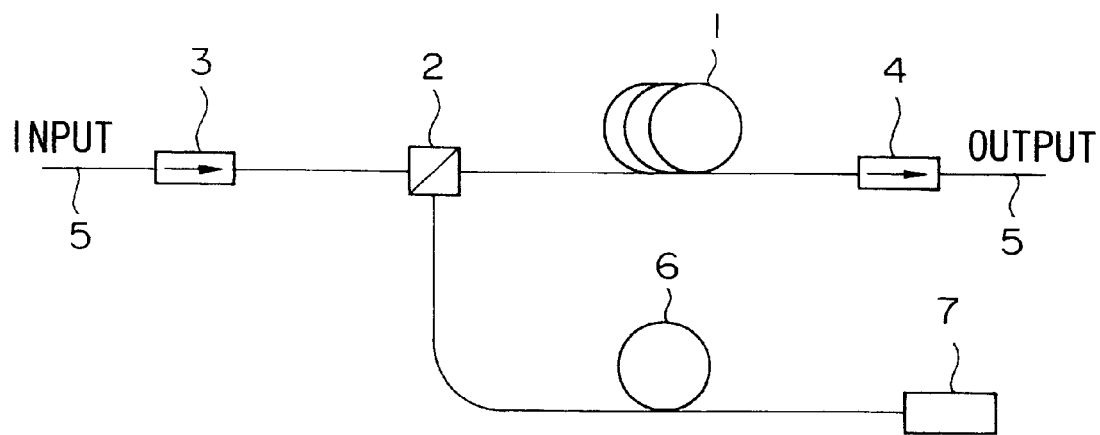
FIG. 1 is a schematic block diagram showing one example of an optical amplifier of the present invention.

FIG. 1 shows an example of the optical amplifier of the present invention.

Reference symbol 1 in FIG. 1 denotes an optical fiber for optical amplification. This optical fiber for optical amplification 1 is a single-mode optical fiber in which a rare earth element such as erbium is doped into a core or into a core and a cladding portion close to the core in an amount of from about 1000 to 2000 ppm. In the present invention, the unit of ppm is expressed by weight ratio for a single atom of the rare earth element. The length of the optical fiber for optical amplification 1 is about 10 to 30 m, and is wound on a bobbin or the like.

The input end of the optical fiber for optical amplification 1 is connected to an optical coupler 2, and a first optical isolator 3 is connected to the former stage of the optical coupler 2, and a second optical isolator 4 is connected to the output end of the optical fiber for optical amplification 1.

An optical transmission line 5 is also connected to the first optical isolator 3, and a signal light is input thereto. The second optical isolator 4 is also connected to the optical transmission line 5, so that the optically amplified signal light is output to the optical transmission line 5.

The optical coupler 2 is connected to one end of a temperature compensation optical fiber 6, and the other end thereof is connected to an excitation light source 7 such as a semiconductor laser. The exciting light from the excitation light source 7 is transmitted to the optical coupler 2 via the temperature compensation optical fiber 6, where this is combined with the signal light by the optical coupler 2 and input to the optical fiber for optical amplification 1.

As the temperature compensation optical fiber 6, a rare earth element-doped optical fiber in which a rare earth element such as erbium is doped at least into the core in an amount of from 1000 to 2000 ppm is used. Particularly, the erbium-doped optical fiber is preferable.

This temperature compensation optical fiber 6 has a length of about 2 to 20 m, and is wound on a bobbin or the like, and the temperature compensation characteristic can be controlled by adjusting the length thereof, as described below.

The length of the temperature compensation optical fiber 6 is also affected by the concentration of the rare earth element contained therein. However, the length needs to be about 2 to 20 m, if the concentration is from 1000 to 2000 ppm.

With this optical amplifier, the exciting light from the excitation light source 7 is input to the optical fiber for optical amplification 1 via the temperature compensation optical fiber 6 and the optical coupler 2, and the signal light from the optical transmission line 5 is input to the optical fiber for optical amplification 1 via the first optical isolator 3 and the optical coupler 2, and the signal light optically amplified by the optical fiber for optical amplification 1 passes through the second isolator 4 and is output to the optical transmission line 5.

Figure 2:
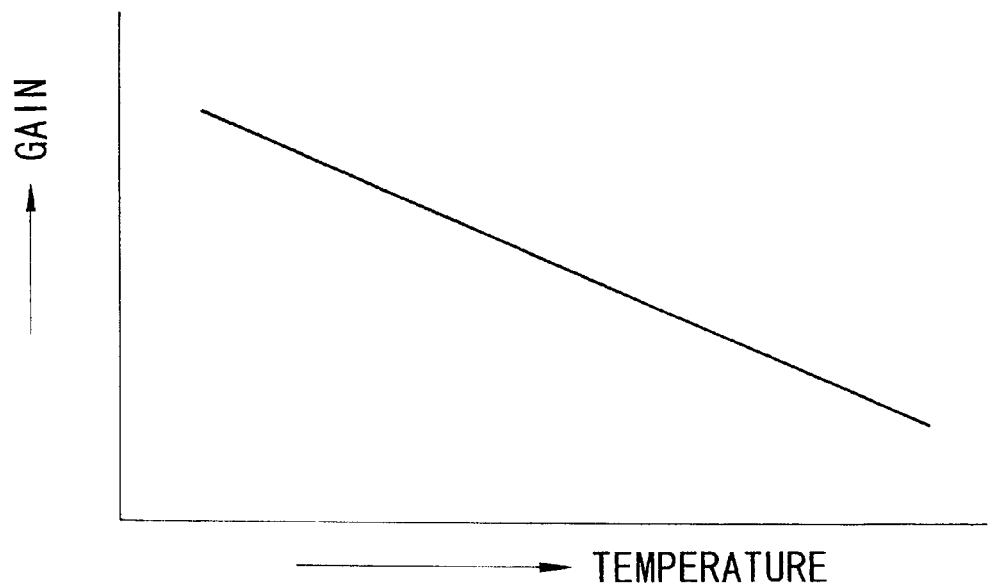
FIG. 2 is a schematic graph showing a gain-temperature characteristic of an optical fiber for optical amplification.

At the time of the optical amplification operation, the gain-temperature characteristic in the optical amplification of the optical fiber for optical amplification 1 shows a characteristic such that the gain decreases with increase in the temperature, as shown in FIG. 2.

Figure 3:
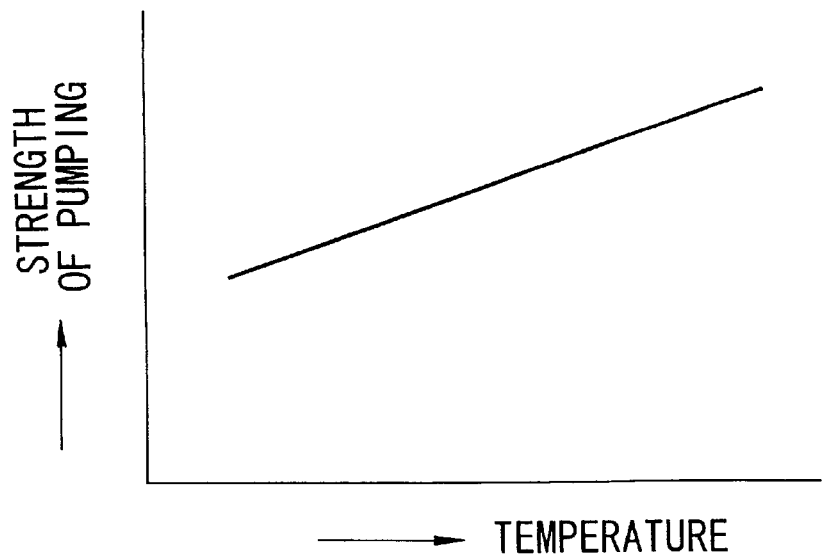
FIG. 3 is a schematic graph showing a temperature-intensity characteristic of exciting light emitted from an optical fiber for temperature compensation.

On the other hand, the temperature compensation optical fiber 6 absorbs a part of the exciting light, and the absorption amount changes depending on the temperature, having a property such that the absorption amount decreases with increase in the temperature. Accordingly, the intensity of the exciting light emitted from the temperature compensation optical fiber 6 changes depending on the temperature, and for example, as shown in FIG. 3, the intensity of the exciting light emitted from the temperature compensation optical fiber 6 increases with increase in the temperature.

Accordingly, the intensity of the exciting light input to the optical fiber for optical amplification 1 also increases approximately in proportion to the temperature increase, and the amplification factor of the optical fiber for optical amplification 1 increases with the temperature increase.

Hence, even if the ambient temperature of the optical amplifier increases, the gain of the optical fiber for optical amplification 1 itself does not change much due to the temperature compensation, thereby improving the temperature characteristic.

Figure 4:
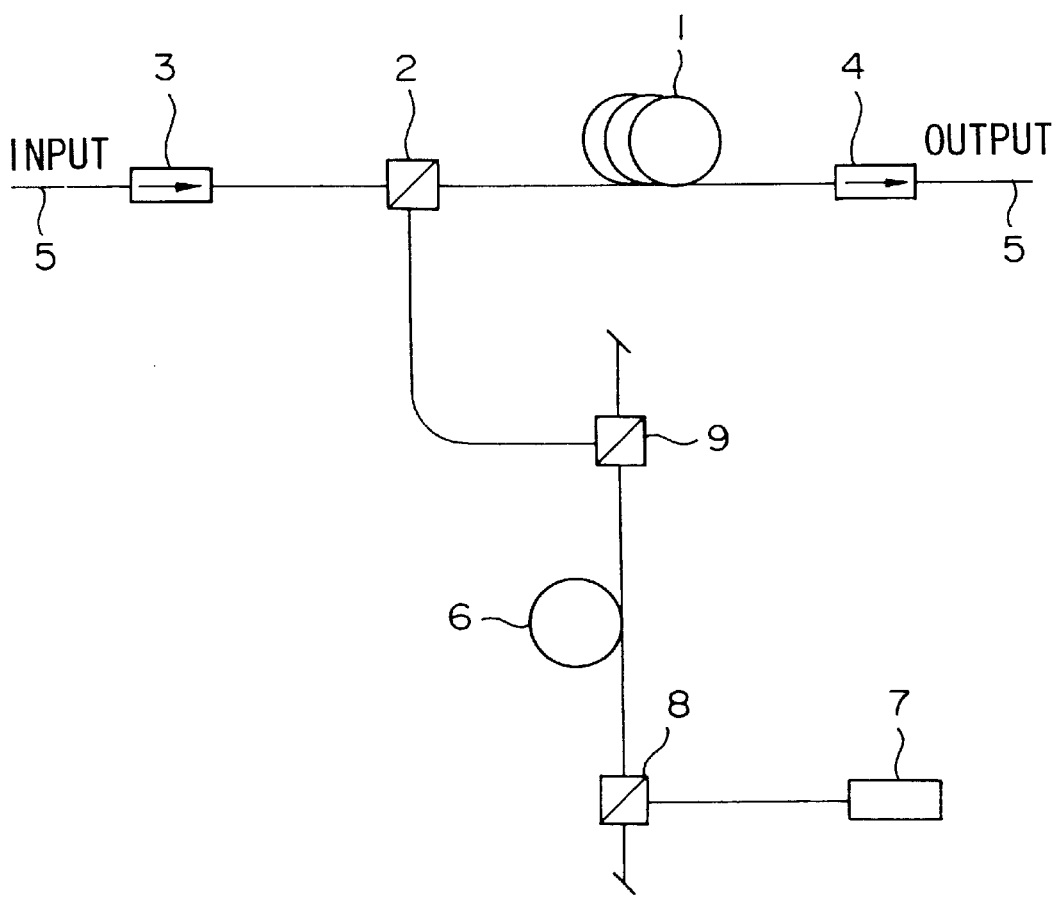
FIG. 4 is a schematic block diagram showing another example of an optical amplifier of the present invention.

FIG. 4 shows another example of the optical amplifier of the present invention. In this example, a second optical coupler 8 is inserted between an excitation light source 7 and a temperature compensation optical fiber 6, and a third optical coupler 9 is inserted between the temperature compensation optical fiber 6 and an optical coupler 2. As a result, when a rare earth element-doped optical fiber is used as the temperature compensation optical fiber 6, oscillation of the spontaneously emitted light in the rare earth element-doped optical fiber used as the temperature compensation optical fiber 6 is prevented, and spontaneous emission from the rare earth element-doped optical fiber is prevented from being input to the optical fiber for optical amplification 1.

With an optical amplifier having such a configuration, light from the excitation light source 7 is made to enter the temperature compensation optical fiber 6 comprising the rare earth element-doped optical fiber, and the outgoing beam from the temperature compensation optical fiber 6 is input to the optical fiber for optical amplification 1 as the exciting light. This shows a characteristic such that the intensity of the exciting light emitted from the temperature compensation optical fiber 6 increases with the temperature increase.

Therefore, though the gain in the optical amplification with the optical fiber for optical amplification 1 itself decreases with the temperature increase, the intensity of the input exciting light increases, and hence the amplification factor increases. Hence decrease in the gain due to the temperature rise is compensated for and becomes small.

Moreover, as the rare earth element-doped e optical fiber constituting the temperature compensation optical fiber 6, one used for an optical fiber for a normal optical amplifier can be directly used. Hence, it is not necessary to prepare a new optical part, thus enabling production at a low cost.

Furthermore, installation of the temperature compensation optical fiber 6 can be done by a normal fusion splice, enabling easy operation.

A temperature compensation method of the present invention will now be described.

Figure 5:
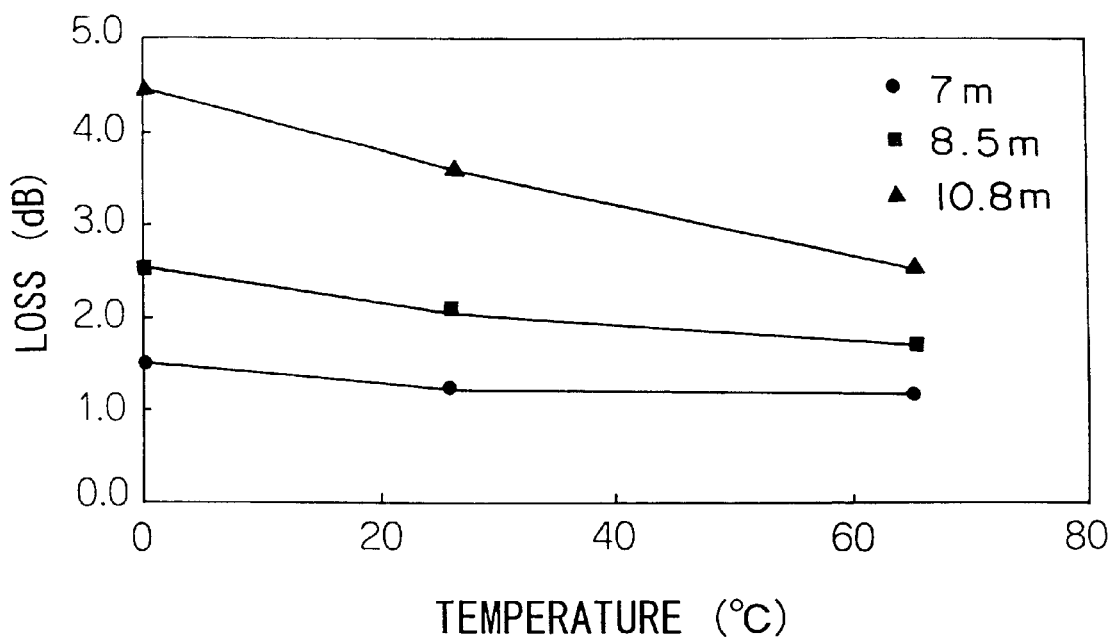
FIG. 5 is a graph showing a relation between temperature and loss in an erbium-doped optical fiber due to absorption of the exciting light, shown for changes in the length of the erbium-doped optical fiber.

FIG. 5 shows a relation between temperature and loss based on the length of an erbium-doped optical fiber and absorption of the exciting light (wavelength of 1475 nm) by this optical fiber, when an erbium-doped optical fiber doped with erbium in an amount of 1020 ppm is used as the temperature compensation optical fiber 6.

From this graph, it is seen that as the length of the erbium-doped optical fiber becomes long, a changed portion in the loss with respect to the temperature change increases, showing a steep relation. Moreover, the longer the fiber length is, the larger the loss becomes.

By utilizing this characteristic, the quantity of the temperature compensation can be finely controlled, by changing the length of the rare earth element-doped optical fiber as the temperature compensation optical fiber 6, thereby enabling optimization of the gain-temperature characteristic of the optical amplifier.

For example, according to the relation shown in FIG. 5, if the length of the erbium-doped optical fiber is 10.8 m, it is possible to give a loss of about 1.8 dB with respect to the temperature change of from 0 to 65° C., if the length thereof is 8.5 m, it is possible to give a loss of about 0.9 dB, and if the length thereof is 7 m, it is possible to give a loss of about 0.3 dB.

Accordingly, when the rare earth-doped optical fiber is installed as the temperature compensation optical fiber 6, the length may be cut short, or extended by additional connection, or a rare earth-doped optical fiber having a predetermined length and having a known characteristic may be used. In this way the gain-temperature characteristic of the optical amplifier can be freely controlled, and optimum characteristics can be obtained.

According to the present invention, rare earth-doped optical fibers doped with rare earth elements such as samarium (Sm), thulium (Tm) or neodymium (Nd) or praseodymium (Pr) may be used as the optical fiber for temperature compensation, other than the erbium-doped optical fiber. Moreover, if this is an optical fiber having an absorption-temperature characteristic as shown in FIG. 3, optical fibers other than the rare earth-doped optical fiber may be used.

Figure 6:
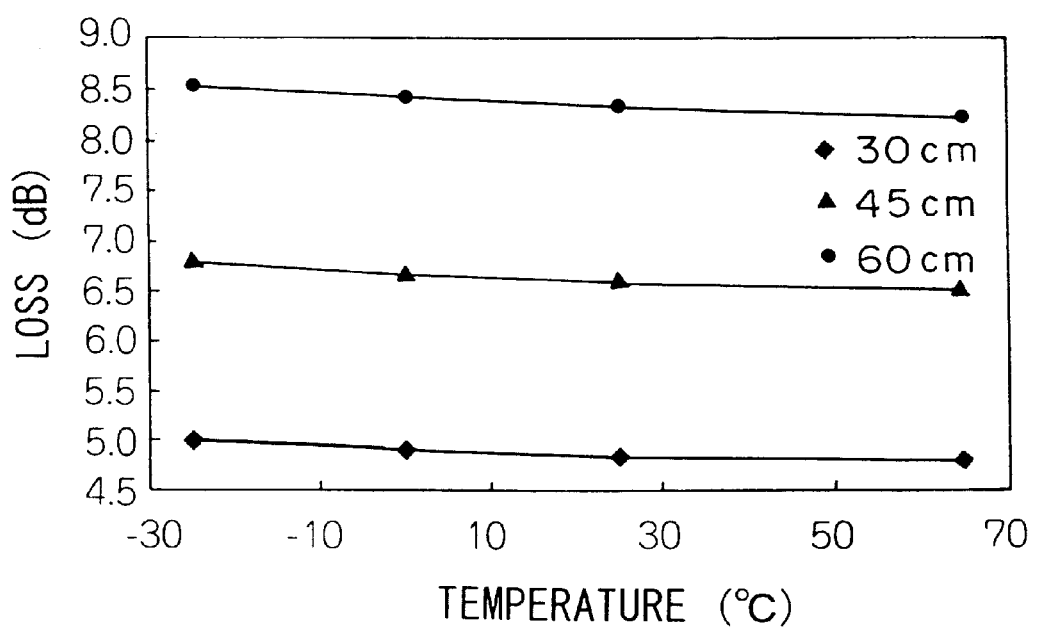
FIG. 6 is a graph showing a relation between temperature and loss in a samarium-doped optical fiber due to absorption of the exciting light, shown for changes in the length of the samarium-doped optical fiber.

FIG. 6 shows a relation between temperature and loss due to the length of a samarium-doped optical fiber and the resultant absorption of the exciting light (wavelength of 1475 nm) by the optical fiber. This shows that this optical fiber has the same function as that of the erbium-doped optical fiber.

A specific example will be described below.

An optical amplifier having the configuration shown in FIG. 1 was prepared.

An erbium-doped optical fiber (mode field diameter of 5.1 μm, and core diameter of 2.7 μm) having a length of 25 m, which was doped with 1020 wt ppm of erbium and 11700 wt ppm of aluminum was used as the optical fiber for optical amplification 1, a semiconductor laser having an output of 100 mW and an output wavelength of 1475 nm was used as the excitation light source 7, a fusion extension type optical fiber coupler was used as the optical coupler 2, and an erbium-doped optical fiber the same as the optical fiber for optical amplification wound for 10.8 m was used for the temperature compensation optical fiber 6.

A signal light having a wavelength of 1550 nm was input to the optical coupler 2 of the optical amplifier at an input intensity of 0 dBm, to thereby perform optical amplification.

The temperature of the whole optical amplifier was changed from 0° C. to 65° C., and variation of gain due to the temperature change at the wavelength of 1550 nm was measured.

Figure 7:
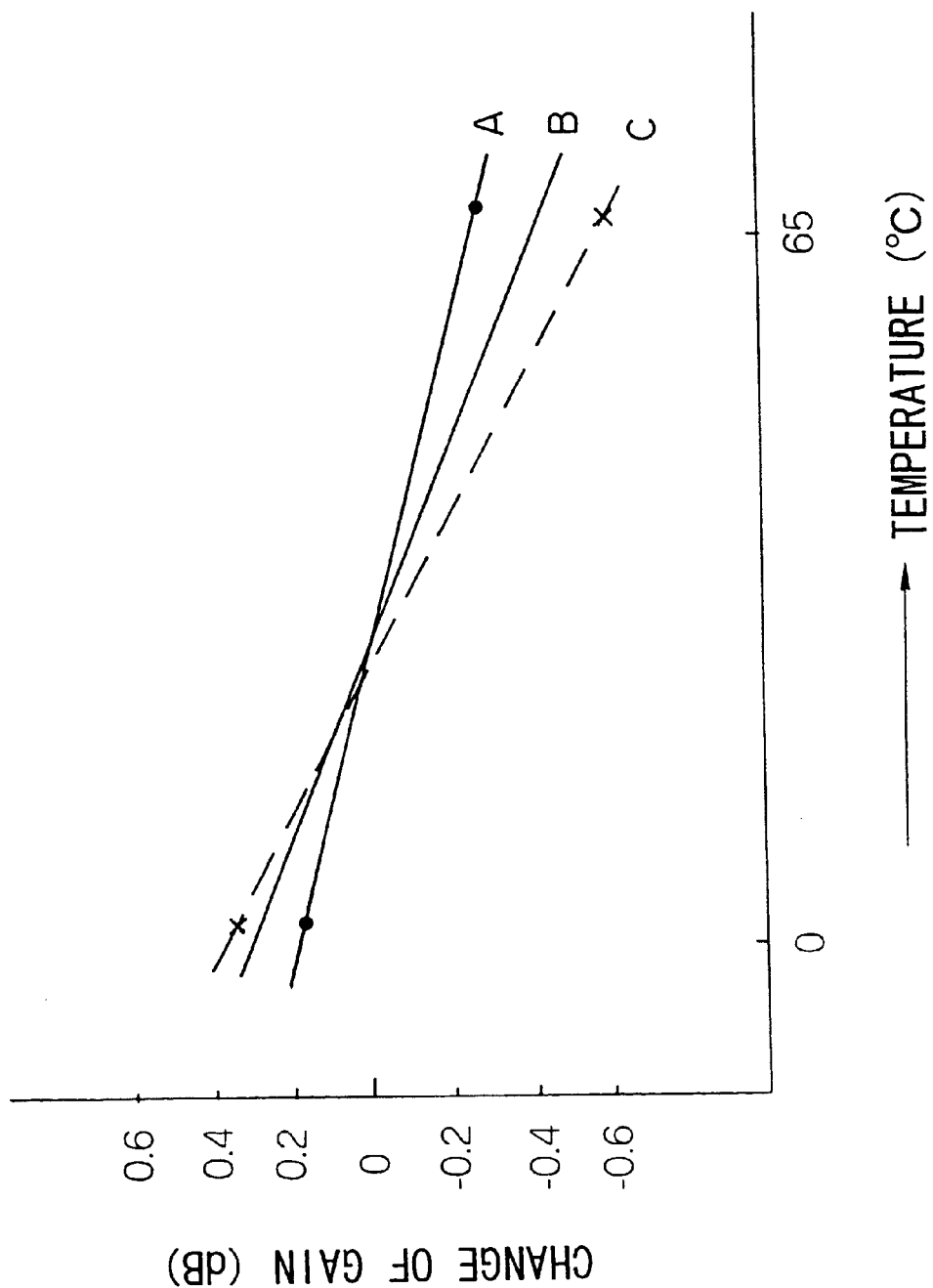
FIG. 7 is a graph showing results of gain-temperature characteristics in specific examples.
Figure 8:
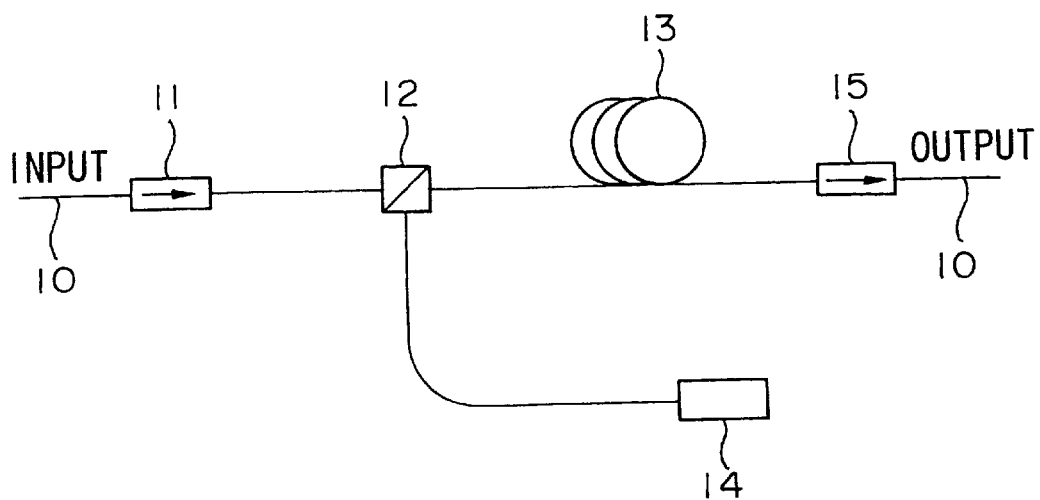
FIG. 8 is a schematic block diagram showing an example of a conventional optical amplifier.

The result is shown by a solid line A in FIG. 7.

The variation of gain due to the temperature change was also measured when the length of the erbium-doped optical fiber for the temperature compensation was reduced to 8.5 m. The result is shown by a solid line B in FIG. 7.

Moreover, as a comparative example, an optical amplifier having no optical fiber for temperature compensation was prepared, and the temperature characteristic was similarly measured with respect to this optical amplifier. The result is shown by a broken line C in FIG. 7.

The results shown in FIG. 7 are expressed using a relative change quantity, designating a gain at 25° C. as a standard.

From these results, it is seen that the variation of gain due to the temperature change can be made small by inserting an optical fiber for temperature compensation comprising an erbium-doped optical fiber, thereby enabling excellent temperature compensation.

It is also seen that fine adjustment of the quantity of the temperature compensation can be performed by changing the length of the erbium-doped optical fiber, thereby enabling optimization of the temperature characteristic.

As described above, with the optical amplifier of the present invention, the light from the excitation light source is input to the optical fiber for optical amplification as an exciting light, via an optical fiber for temperature compensation comprising a rare earth element-doped optical fiber such as erbium-doped optical fiber. Since the intensity of the exciting light emitted from the optical fiber for temperature compensation increases with the temperature increase, even if temperature rises, the amplification factor of the optical fiber for optical amplification does not decrease. Hence variation of output from the entire optical amplifier due to the temperature change can be compensated for and suppressed.

Moreover, with the temperature compensation method of the optical amplifier according to the present invention, the quantity of temperature compensation can be finely adjusted, by changing the length of the optical fiber for temperature compensation. Hence an optical amplifier having an optimum gain-temperature characteristic can be easily obtained.

Furthermore, it is not necessary to prepare new optical parts, and an optical fiber for temperature compensation can be easily inserted by fusion splice. Since the structure is simple, there is another effect in that the cost increase is minimum.

What is claimed is:

1. An optical amplifier comprising:
    an optical fiber for optical amplification which amplifies signal light by photoexcitation;
    an excitation light source for supplying exciting light to said optical fiber for optical amplification; and
    a temperature compensator consisting of an optical fiber inserted between said excitation light source and said optical fiber for optical amplification,
    wherein said optical fiber for temperature compensation changes a supply quantity of the exciting light with temperature change, to thereby compensate for variations in gain with temperature change of said optical fiber for optical amplification.

2. An optical amplifier according to claim 1, wherein said optical fiber for temperature compensation is a rare earth element-doped optical fiber.

3. An optical amplifier according to claim 1, wherein said optical fiber for temperature compensation is an erbium-doped optical fiber in which erbium is doped into a core in an amount of from 1000 to 2000 ppm.

4. A temperature compensation method of an optical amplifier, involving inserting between an optical fiber for optical amplification which amplifies a signal light by photoexcitation and an excitation light source for supplying exciting light to said optical fiber for optical amplification, a temperature compensator consisting of an optical fiber, which changes a supply quantity of the exciting light with temperature change, to hereby compensate for variations in gain with temperature change of said optical fiber for optical amplification.

5. A temperature compensation method of an optical amplifier according to claim 4, wherein a length of said optical fiber for temperature compensation is changed to thereby perform fine adjustment of the compensation quantity.

* * * * *